United States Patent [19]

Mashiko et al.

[11] Patent Number: 4,717,965
[45] Date of Patent: Jan. 5, 1988

[54] PORTABLE IMAGE FORMING DEVICE

[75] Inventors: Harumitsu Mashiko, Yokohama; Yoshihiro Sakai, Tokyo; Syoji Hayashi, Kawasaki; Yoshihiro Ogata, Yokohama; Tsuyoshi Yoshimura, Tokyo; Hisashi Kuroda, Tokyo; Shigeru Suzuki, Yokohama, all of Japan

[73] Assignee: Ricoh Company, Ltd., Tokyo, Japan

[21] Appl. No.: 818,197

[22] Filed: Jan. 10, 1986

[30] Foreign Application Priority Data

Jan. 17, 1985 [JP] Japan ................................ 60-004892
Jun. 20, 1985 [JP] Japan ................................ 60-132945
Jun. 20, 1985 [JP] Japan ................................ 60-132946
Jun. 20, 1985 [JP] Japan ................................ 60-132947

[51] Int. Cl.⁴ ............................................. H04N 1/028
[52] U.S. Cl. ..................................... 358/285; 358/293; 358/294
[58] Field of Search ........................ 358/285, 293, 294

[56] References Cited

U.S. PATENT DOCUMENTS

4,319,283  3/1982  Ozawa ................................ 358/293
4,523,235  6/1985  Rajchman ......................... 358/293
4,574,317  3/1986  Scheible ............................ 358/285

Primary Examiner—Michael A. Masinick
Attorney, Agent, or Firm—Cooper, Dunham, Griffin & Moran

[57] ABSTRACT

A portable image forming device which is moved on an original in a direction perpendicular to a primary scan direction for subscan, and divides original reflection light beams into picture pickup elements in the primary scan direction through an image forming optical system to imageform the pickup elements on a pickup device for reading. The pickup range of the pickup device in the primary scan direction is designed to be variable, and means for setting the pickup range is provided. With a portable copying machine which houses the pickup device and a printing section including a writing head in a single casing, paper is fed to the printer section as required by making use of the movement of the machine for original scan.

20 Claims, 14 Drawing Figures

PORTABLE IMAGE FORMING DEVICE

FIELD OF THE INVENTION AND RELATED ART STATEMENT

This invention relates to a portable image forming device which is moved on an original document to perform sub-scanning and at the same time picks up a picture image of arbitrary part of on the original.

When a part of a large-sized document such as a newspaper is to be selectively copied, or a document now being read on a desk is to be easily copied on the spot without taking the trouble of standing up and going to a stationary copying machine, it is convenient if there is a portable copying device or image pickup device by which an image can be picked up only by moving the device on the document, and then copies are made by inputting the image into a self-contained recording head or a separate printer provided with a word processor.

A device to accomplish such a copying can be made of a pickup portion, a data processing portion where the data read by the pickup portion is processed to be outputted as image information signals, and an image output portion where the image information signals activate a recording head to output the relevant image. The three portions may respectively be separate or be housed in a single device, but it is necessary that a device including the pickup portion should be able to be carried and exactly moved in a given direction by being supported on a document through rollers or the like.

As means to pickup an image, various configurations have been under consideration, such as: (1) An original paper is illuminated by a source lamp or an external light in a slit extending in the primary scan direction, the illuminated part is projected in equal or reduced size on CCD, photo-diode array or other image sensor arranged in the primary scan direction through common lenses or a rod lens array, and the image is picked up by picture pickup elements, (2) While a light emitting diode array extending in the primary scan direction is being flashed in turn from one end, an original is light scanned in the primary scan direction through an image forming optical system, and its reflected light beams are picked up by a photo diode, and (3) By directing light beams reflected from an original illuminated in slit shape through rotary polygon mirror onto a photo diode or other photo sensor secured at a fixed point, the position where the original light beams incoming into the photo sensor are issued is moved in turn in the primary direction.

Now, when reading a wider original than the width of a portable image forming device, to make a complete copy, first the whole length of the original is divided into a plurarity of strips having sub-scan width of the image pickup device, then each strip in turn is sub-scanned by the portable pickup device for reading, and finally the read signals are edited and outputted into the image output section. In this case, however, since the subscan for pickup is performed manually, it is difficult to completely juxtapose the start point of a new subscan to the end point of the preceding subscan as well as to have no overlap or no gap between two corresponding end lines of the two adjacent pickup widths, thus causing inevitable offsets in the subscan and primary scan directions. When a border line of a pickup range should fall onto a space where characters are lined up, there may occur difficulties such as characters offset at their middle portions to the left or right, and characters shortened or broken at their middle portions. On the other hand, when the border line should fall on a space between the lines, there may occur offset of two adjoining character lines. But in this case it doesn't matter since characters can keep their shape. But, even if one border line of a pickup range can be set between character lines, the other border line does not always fall between the other character lines, depending on the character line spacing of an original, thus causing difficulties.

Furthermore, it is desirable that portable copying apparatus incorporating a pickup portion, a data processing portion and a printer portion, be small in size, light in weight and easy in handling.

OBJECT AND SUMMARY OF THE INVENTION

An object of the invention is to provide a portable image forming device which can eliminate the drawbacks of the prior art irrespective of character line spacing of originals, and another object is to provide a portable copying apparatus which is small in size, light in weight, and easy in handling.

To achieve the first in, a portable image forming device according to the invention the pickup width of the primary scan direction can be changed and means are provided to set the pickup width. In the case of variable pickup width, it is also desirable for high resolution that a picture image of a pickup width be picked up by all picture elements of the pickup device. Therefore, it is also desirable that the image forming optical system and the pickup device are displaced such that the picture images of a preset pickup width are uniformly picked up by a constant number of picture pickup elements, independently of the presetting of the pickup width.

To achieve the second object, a portable copying apparatus according to the invention comprises a pickup portion including a pickup device where document images are projected in slit shape, a printer section including a writing head where the output of said pickup device is written on a web of paper as the picture image, and said pickup portion and said printer portion are incorporated into a single casing. The original reading scan is performed while moving the copying apparatus on the original, and said web of paper is fed into said writing head as required.

BRIEF DESCRIPTION OF THE DRAWINGS

In the accompanying drawings, there are shown illustrative embodiments of the invention from which these and other of its objectives, novel features and advantages will be readily apparent.

In the drawings.

DETAILED DESCRIPTION OF PREFERRED EMBODIMENTS

The drawings depict in detail preferred embodiments in accordance with the invention.

Figure 1:
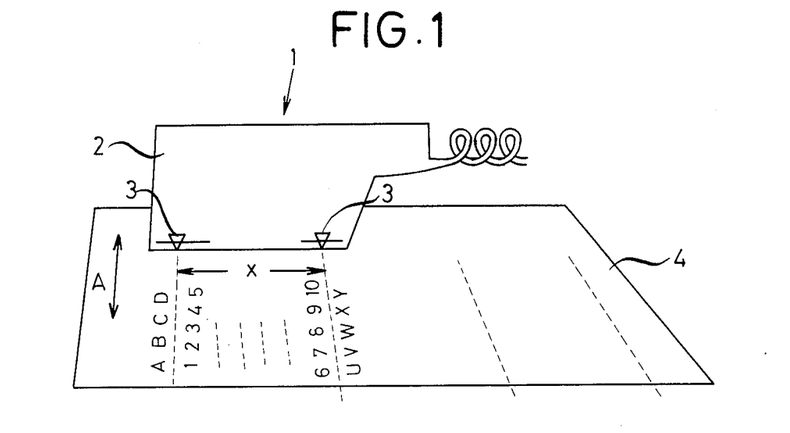
FIG. 1 is a perspective view showing the front face of an embodiment for a portable image forming device according to the invention.
Figure 2:
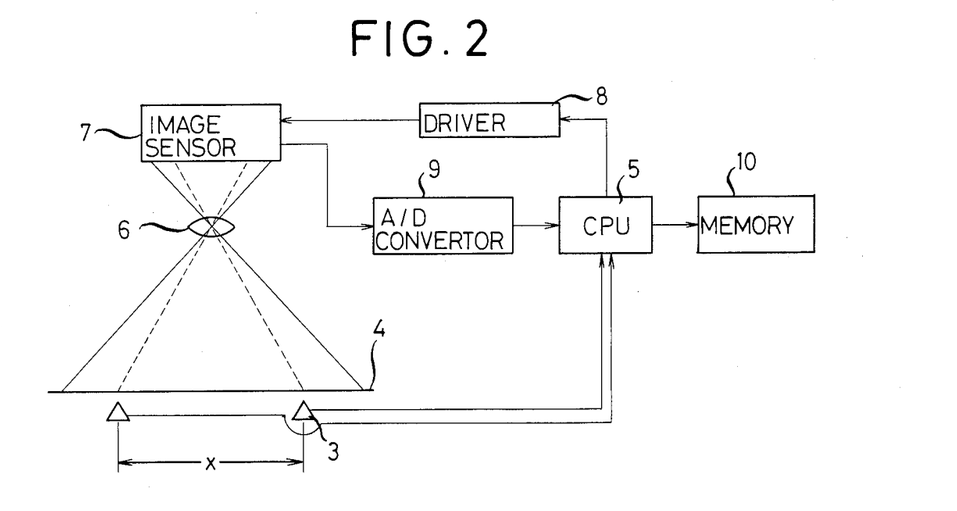
FIG. 2 is a block diagram of the pickup device in FIG. 1.

FIG. 1 illustrates an embodiment of a portable image forming device 1 according to the invention. In the vicinity of the external bottom edge of a housing 2 placed perpendicular to a subscan direction A, cursors 3 are provided slidably in the primary scan direction to specify a pickup range x. By sliding the cursors to specify the pickup range x, as shown in FIG. 2, the specified pickup range is inputted into CPU 5, which controls driver 8 so as to inactivate the picture elements outside the specified range in image sensor 7, or alternatively may control the entire system so that, among all of the data read by each picture element in the image sensor 7 through an image forming optical system and inputted into the CPU 5 through A/D converter 9, data picked up by the picture elements outside said preset range are nullified and outputted into memory 10.

When reading an original by means of such a portable image forming device as described above, the cursors on both sides are so positioned that both cursors fall onto spaces between character lines on the original. This setting negates the picture elements outside the pickup range x preset by said cursors 3 among all of the picture elements in the image sensor 7. When the image forming device 1 is set on the original 4 so that the cursors 3 fall onto the spaces between character lines, and then moved in the direction of Arrow A, every character line between the cursors (the arabic numerals in FIG. 1) is picked up by the active elements in the image sensor 7 and stored in the memory. When scanning is over for the first scan-wide part of an original, the image forming device is shifted to the next adjoining scan-wide part (with the example in FIG. 1, the range of the preset width which begins with the line of U V W X . . . ), across which the two cursors are placed, and scanned similarly and the cycle of the above operation is repeated until the entire pickup range of the original is finally covered. In such a manner, picked-up and recorded data are edited at the data processing section, and picture image signals arranged like the original 4 are sent to the picture image output section, which in turn makes a copy corresponding the original. According to the presetting method as stated above, border lines of successive scan ranges never fail to fall in spaces between character lines, thus eliminating the chances of vertically offset or broken or distorted characters, if there might be offset spaces between copied character lines.

Now, as described above, when changing the width of active picture elements in the image sensor 7 in correspondence with the pickup range preset by the cursors 3, an original would be picked up in constant resolution independent of the size of the pickup range. In other words, the picture elements in the image sensor located outside an active pickup range would be idle. So, apart from the case in which an image sensor with a sufficiently fine resolution is used, it is unreasonable that part of the picture elements in an image sensor with a rough resolution is not utilized. Therefore, when the cursors specify a pickup range, if the picture image of the specified range should be projected over the entire elements in the image sensor, high-resolution reading can be expected for the limited picture image within the specified pickup range.

Figure 3A:
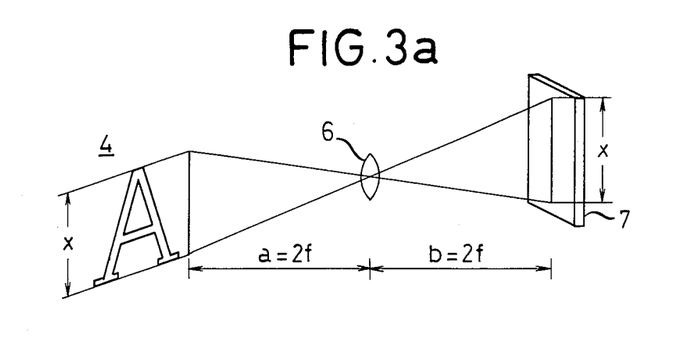
FIG. 3a is a picture showing relative positions of an original, lens and pickup element, in the case where the image of an original is formed on the pickup element in the same width as the original pickup width of the pickup device.
Figure 3B:
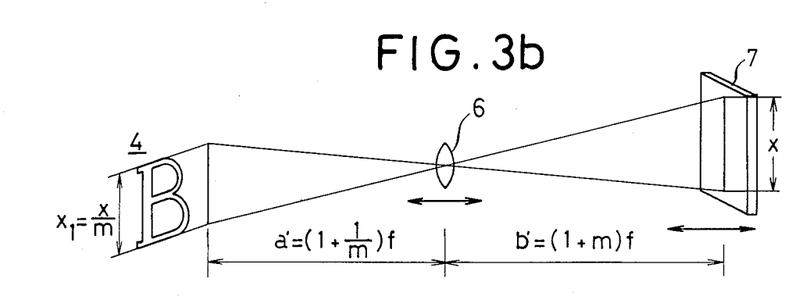
FIG. 3b is a picture showing relative positions of an original, lens and pickup element, in the case where the image of an original is formed on the pickup element in the extended width as compared with the original pickup width of the pickup device.

To project a pickup width x on an original 4 onto the same length x on the image sensor 7, as shown in FIG. 3a, the distance a from the original to the image forming lens 6 ought to be equal to the distance b from the image forming lens 6 to the image sensor 7, and to twice the focal length f of the lens 6. Now, if a pickup width x on the original 4 becomes x/m, to form a length x of the image on the image sensor 7, as shown in FIG. 3b, the lens 6 and the image sensor 7 respectively ought to be shifted relative to the original surface 4 so that the distance a' from the original 4 to the lens 6 and the distance b' from the lens 6 to the image sensor 7 respectively become $(1+1/m)$ f and $(1+m)$ f. Even in the case where the length y of the image sensor is smaller than the original scan width x in the standard condition, projection length can be maintained at y, using the relationship as described above.

If the aforesaid movement of the imageforming lens 6 and the image sensor 7 is interlocked with the movement of the cursors 3, the pickup range on an original preset by the cursors can always be read by all the picture elements in the image sensor, thus improving resolution.

Figure 4:
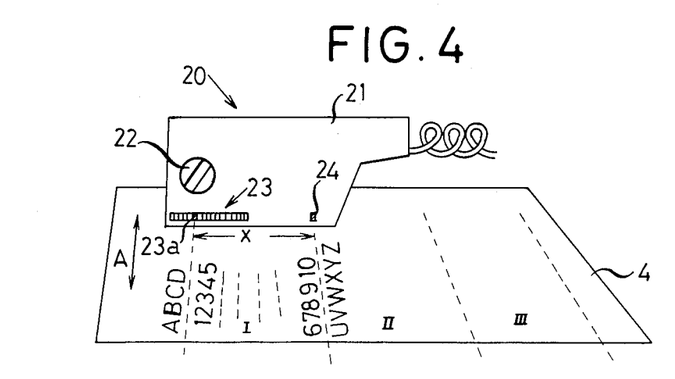
FIG. 4 is a perspective view showing the front face of another embodiment according to the invention.
Figure 5:
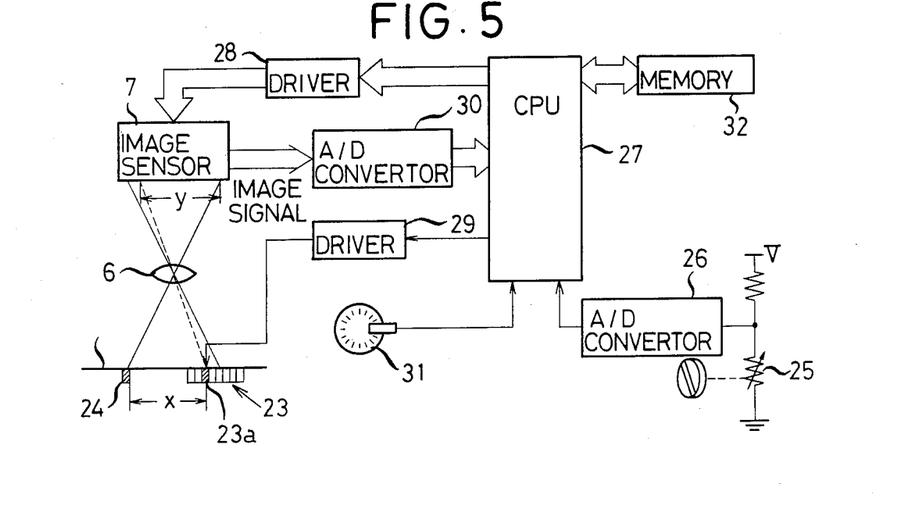
FIG. 5 is a control block diagram of the embodiment in FIG. 4.

Next, FIGS. 4 and 5 illustrate another embodiment of a portable image forming device according to the invention which has different means of setting pickup width. FIG. 4 is a front view of an embodiment of said portable image forming device 20, viewed from the subscan direction. On the front face of a housing 21, a knob 22 for setting the pickup width is provided, on the left half close to the bottom end of the front face of the housing 21 a number of LEDs 23 are lined up, and on the right side thereof a LED 24 is disposed. The knob 22 for setting pickup width is fixed to the shaft of the rotary type variable resistor 25. Rotation of the knob will change the resistance in accordance with rotation angle. The train of the LEDs 23 is provided to indicate the left end of preset pickup width, one LED of which will light to show that the distance between the lighted LED and the rightside LED is the preset width of original reading.

FIG. 5 is a control block diagram of the embodiment. Any angular rotation of the knob 22 for presetting pickup width will change the resistance value of the variable resistor 25, voltage across which is converted into digital signal through A/D convertor and inputted into CPU 27. Based on the inputted digital signal, the CPU 27 controls the image sensor 7 through driver 28 so that data of the picture elements of the image sensor 7 located outside the pickup range corresponding to said signal are nullified, and turns on through driver 29, a LED 23a located at the position corresponding to said signal among the train of LEDs 23.

Now, the reading an original by means of the device proceeds as follows:

In FIG. 4, an original is divided into three portions, I, II and III for scanning by the portable image forming device 20. The width of the divided scan range I is set to a width x such that both ends of the scan range fall on blank spaces between character lines. To set the pickup range to x, first place the image forming device on the original so that the LED 24 is lined up with the right border line of the scan range, for instance I, second turn on the power source, and third manually turn the knob 22 for setting pickup range until the LED 23a which is on the left border line of the pickup range I comes on. This will complete the setting of the pickup range of the device to x. In FIG. 5, picture elements outside the portion y of the image sensor 7 corresponding to the picture width x on the original are nullified. Therefore, when the portable image forming device 20 is subscanned in the direction of Arrow A in FIG. 1, the portion I on the original 4 is picked up by the picture elements located at the portion Y of the image sensor 7 as shown in FIG. 5, converted into digital signals by A/D converter 30, and inputted into the CPU 27. Pickup ranges II and III on the original 4 are read similarly, and their picture image signals are inputted into the CPU 27.

The position of the portable image forming device after moving in the subscan direction (in the direction of Arrow A in FIG. 4) is calculated by the CPU 27 based on pulses signalled from disc-type pulse generator 31 whose shaft is supported by the image forming device 20 and which rotates as one-piece with the shaft of the rollers rolling on the original. The CPU 27 edits each of the picture image signals of said pickup ranges I, II and III, and each of the positional signals in the subscan direction corresponding to these respective image signals into total picture image signals matching the original information, outputs them into memory 32, and timely prints them on a copy web.

Figure 6:
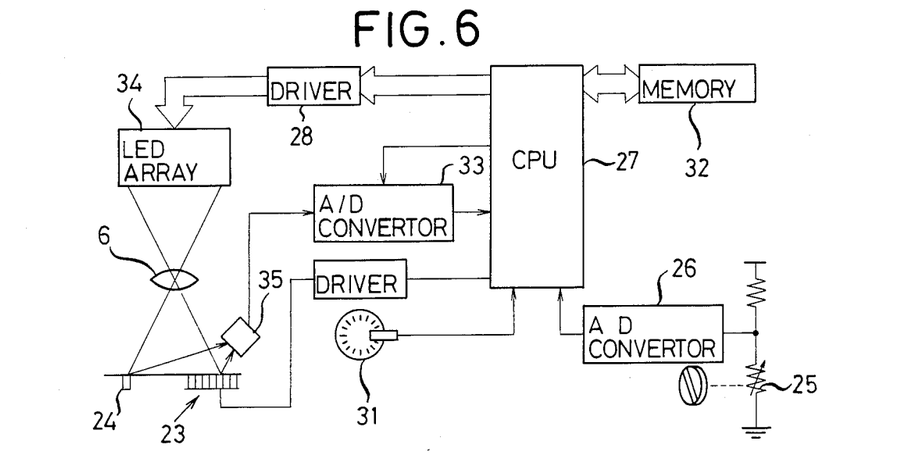
FIG. 6 is a control block diagram of a modified embodiment according to the invention.

FIG. 6 is a control block diagram of another embodiment in which each element of LED array 34 in turn illuminates an original 4, and the picture images are picked up by a photo diode 35. Like numerals refer to like parts in the embodiments in FIGS. 5 and 6. Digital signals corresponding to the resistance value of the variable resistor 25, preset by the knob 22 for setting pickup width controls the lighting range of LED array 34 from the CPU 27 through driver 28, and turn on one of LEDs 23 to indicate the right border line of the pickup range. The picture image information, which is light scanned by each LED of the LED array 34, reflects from the original, and is picked up by photo diode 35, is inputted into the CPU 27 as digital signals through A/D convertor 33, and is processed in the same manner as in the earlier embodiment, and stored into the memory 32.

Figure 7:
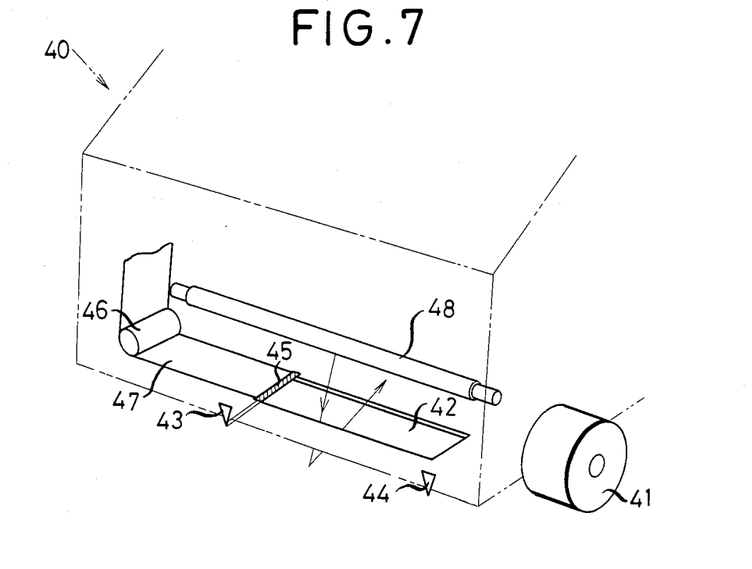
FIG. 7 is a perspective view showing main parts of a further different embodiment according to the invention.
Figure 8:
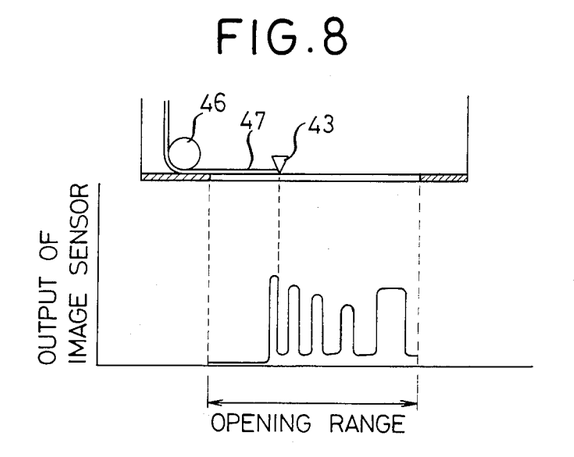
FIG. 8 is a schematic drawing showing the operation of the embodiment.
Figure 9:
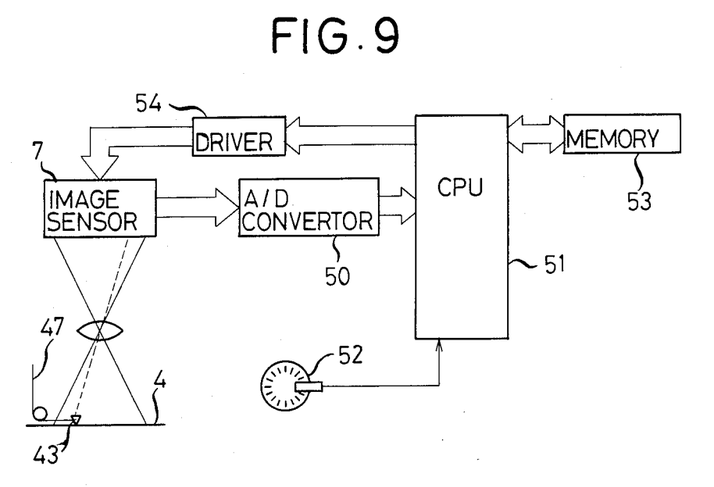
FIG. 9 is a control block diagram of the embodiment.

Next, an additional embodiment according to the invention is illustrated in detail based on FIGS. 7 to 9.

FIG. 7 shows mainly the opening of the original pickup portion of said embodiment. A pickup device 40 is provided with rollers 41 on the both sides so that the device can move straight in the subscan direction, keeping a constant distance away from the top surface of an original 4. The bottom in the vicinity of the front end of the device housing is provided with a slit-shape opening 42 extending in the primary scan direction to receive original reflection light beams arriving at the image sensor through the image forming optical system (not shown) in the housing. In the vicinity of the bottom edge of the front face (viewing in the subscan direction) of the housing, a cursor 43 is provided to set the original pickup range to an arbitrary length. The pickup range is set as the distance between the variable cursor 43 and an index 44 fixed to one end of the opening 42. Across the opening 42, a slender bar-like member 45 is slidably disposed to move integrally with the cursor 43. A light-screening film 47 attached to one end of the member 45 can be rolled in and out under tension through a guide pulley 46 disposed inside the opening at the end opposed to the index 44, so as to cover the part of the opening 42 between the member 45 and the pulley 46. In this embodiment, the surfaces of the member 45 and the film 47 facing the image sensor are painted respectively in black and in white.

Now, set the cursor 43 at a desired position, and turn on the original illumination light source 48 placed in the housing. When beginning to read the original from the left to the right on FIG. 9 by the image sensor 7 driven by the CPU 51 through the driver 54, data being read are, at first, white for the part of the film 47 as shown in FIG. 8, then black when the light from the image sensor falls on the bar-like member 45, and, after that, data corresponding to the original picture image continue to be read. Therefore, the CPU, to which successive data being read are sent, ought to judge the data following the black signal coming first after initiation of reading the first line in the primary scan direction to be the true one for the picture image.

Of course, the inner surface of the film may be painted in black, that of the bar-like member in white, and the first white data following the succesive black one may be judged to be the indication of the beginning of the picture image data.

FIG. 9 is a control block diagram of the embodiment. When an original pickup range has been set by the cursor 43, and scanning is started, the picture image is read by the image sensor 7 and converted through the A/D convertor into digital signals, of which the CPU 51 judges the ones following the black signal first coming after the first white one corresponding to the first primary scan line to be the true picture image ones. If an original is divided into a plurality of pickup ranges for reading, the same way of reading is performed for each divided portion.

Displacement in the subscan direction of the pickup device 40 is detected as digital signals by the pulse generator 52 interlocking with aforesaid rollers 41, and the signals are inputted into the CPU 51, which processes both the aforesaid picture image signals and positional signals for the subscan direction corresponding thereto, outputs composed signals as picture image information signals corresponding to the original to store them into the memory 53, and again timely outputs them to form a target copy.

Figure 10:
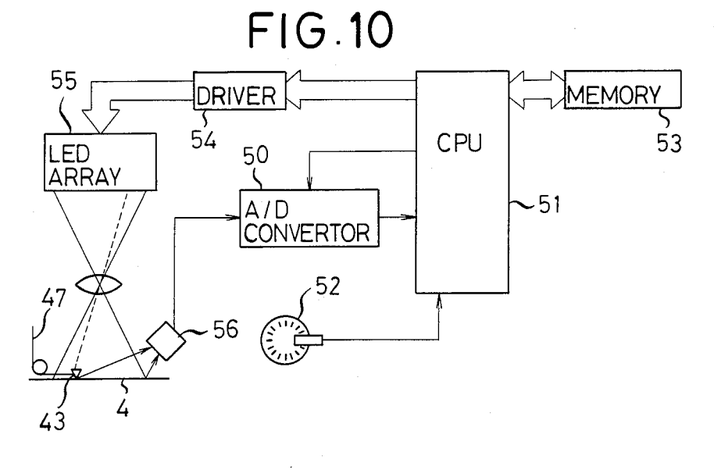
FIG. 10 is a control diagram of the modified embodiment.

FIG. 10 is a control block diagram of an other embodiment where each element of LED array 55 in turn illuminates an original, and reflecting light beams are picked up by photo-diode 56. Like numerals are provided for parts which are like those in the embodiment shown in FIG. 9. All LEDs in the LED array 55 illuminating an original 4 are in turn energized by the CPU 51 through the driver 54 for flashing. By presetting the pickup range with the cursor 43, the film 47 covers a part of the pickup opening, which reflects LED light beams on its white surface. Then, following the black portion associated with the cursor 43, LED light beams are reflected for the first time on the picture image of the original, are read as picture elements by photodiode 56, are converted into digital signals by A/D convertor 50, and are inputted into CPU 51. The CPU 51 judges the data following the first black signal succeeding the first white light beams to be picture image information, processes the data along with positional signals for the subscan direction by pulse generator 52, and stores the composed data into the memory 53, as described for aforesaid embodiment.

As mentioned above, according to the invention, once an image pickup range is set up using a cursor or a knob, data associated only with the preset pickup range are judged image information to process. Since the pickup range can be arbitrarily selected in one simple operation, it is very easy to put both border lines of pickup range within black spaces between character lines of an original.

Next, a preferred embodiment to achieve the second objective is explained in detail using drawings.

Figure 11:
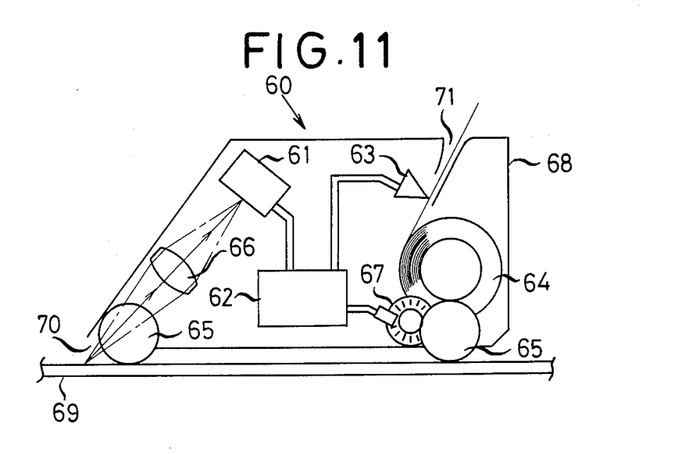
FIG. 11 is a side sectional view showing the configuration of a further different embodiment according to the invention.

FIG. 11 is a sectional view of a portable copying machine according to the invention. The casing 68 of the copying machine 60 is a little wider than the web width in copy size (for example, approximately 10.5 cm for a copying machine aiming at the range on the order of ¼ times A 4 size), and, in the front end of the bottom, a slit 70 is provided substantially over the full width to receive light beams reflected from the surface of an original 69 by external light. The original light beams incident from the slit 70 form their images through an image forming lens on the surface of a CCD line sensor, diode array or other image pick-up elements 61 which extend parallel to the slit 70, and are picked up by the elements. In other words, the image forming lens and the image pick-up elements combine to form an image pick-up section. A light source for original illumination may be installed in the casing 68, and when an equal-size image sensor is used as the image pick-up element, a gradient-index rod lens array or other equal-size image forming optical systems may be used instead of the imageforming lens 66. Data read by the image pick-up elements 61 are inputted into a control 62 comprising CPU and memory.

In the casing 68, a writing head 63 such as a thermal head or an electrochemical head is provided to operate when data outputted from the control 62 are inputted, and thermal paper or other web of paper, which is extended out from a recording paper roll such as thermal paper roll loaded in the casing 68, is fed towards the writing head 63, and is discharged out of the machine through an exit 71 after printing.

In the vicinity of the front and rear bottom ends of the casing 68 are disposed rollers 65, which rolls on the original surface 69 when reading. The rear roller 65 rotates the aforesaid recording paper roll 64, from which recording paper is fed to the writing head. Roller 65 is designed to rotate a pulse generator which sends pulses to the control 62.

A handle is provided on the casing 68 to help the operator move the casing, while the front and rear rollers 65 are rolling in contact with the original surface 69 at the range being copied. Light beams reflecting from the original pass through the slit 70 and the lens 66, from an image on the image pickup elements 61, are read thereby, and are finally stored in the control 62.

If the writing head 63 has the same width as that of copying paper, and can write one character line at one stroke, thermal paper or other recording paper roll ought to be fed to the writing head 63 at the same speed as the original scan speed. In this connection, if the pulse generation interval of the pulse generator 67 is designed to correspond to the line spacing of the writing head, the control 62 outputs one line of data received by the pickup elements 61 to the writing head 63 each time when the control receives one pulse. When no pulse arrives at the control, the data is kept stored in the control 62.

By performing the operation as described above, without controlling the scan speed, reading and writing can be synchronized.

If a writing head 63 is designed to scan to the left and right (primary scan), this kind of copying machine should have a mechanism by which the rotation of the rollers 65 moves the writing head 63 to the left and right, and, each time the head is returning, the paper roll is fed by the number of lines written at a time. For example, with a writing head which writes 8 dot lines simultaneously in the primary scan direction, the copying machine ought to store 8 lines of data (8 pulses issued by a pulse generator which generates one pulse per one line) coming from the image pickup elements in the control 62, output the 8 lines of data so as to match head movement after the return of the head, and feed out thermal paper by 8 lines when the writing head is about to return after its one-way scan.

Figure 12:
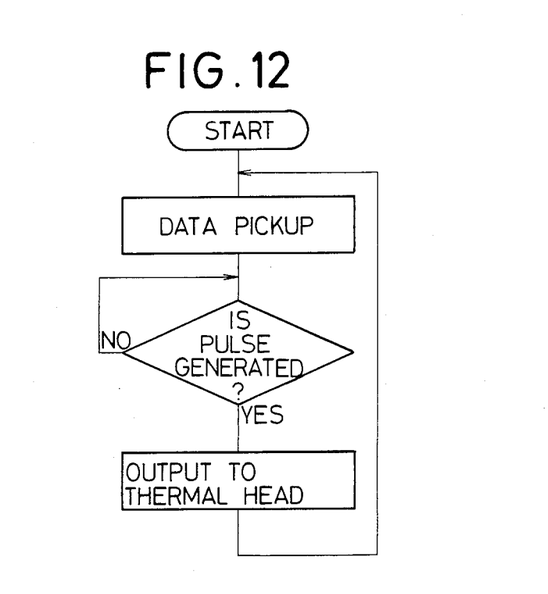
FIG. 12 is a flow chart of the copying operation of the embodiment in FIG. 11.

The flow chart in FIG. 12 shows the copying operation when using a writing head which writes one line of data at a time; read data, wait for pulse generator's pulse, and, when pulse is issued, output one line of data to the head, read the next data, wait for the next pulse, and so on.

Figure 13:
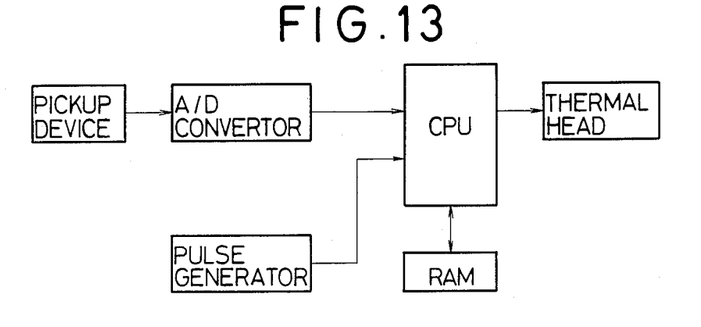
FIG. 13 is a block diagram of the control section.

FIG. 13 is a block diagram including the control 62 in FIG. 11, in which picture image data sent from the image pickup device 61 is converted into binary data by A/D converter 81 or comparator, and inputted into CPU 82. RAM 83 ought to be large enough to store binary data for one line of picture image.

According to the invention, as apparent from the description above, since the entire copying apparatus is housed in one extremely compact casing, it can be carried and handled easily, and all mechanical drives can be operated by the simple manual movements of the device. Thus, it minimizes power consumption, leading to effective energy saving.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A portable image forming device which is moved on an original in a direction perpendicular to a primary scan direction to perform a subscan, and divides reflection light beams from the original into pickup picture elements in the primary scan direction through an image forming optical system to form an image of the picture elements on a pickup device for reading, and which comprises:

a pickup device having a pickup range which is variable in the primary scan direction; and
means for selectively setting said pickup range.

2. A portable image forming device as in claim 1, including means for displacing the image forming optical system and said pickup device, wherein said displacing means is interlocked with the means for setting said pickup range to cause the image of the original within said pickup range to be always picked up by a constant number of picture image pickup elements.

3. A portable image forming device as in claim 1, wherein said pickup range setting means comprises:
pickup range setting cursors slidably disposed in the primary scan direction on the outer surface of the housing of said image forming device; and
control means interlocking with the movement of said cursors to inactivate picture elements corresponding to parts of the original which are outside the range set by said cursors.

4. A portable image forming device as in claim 1, wherein said pickup range setting means comprises:
pickup range setting cursors slidably disposed in the primary scan direction on the outer surface of the housing of said image forming device; and
control means interlocking with the movement of said cursors to negate data picked up by picture elements outside the picture elements corresponding to the range set by said cursors.

5. A portable image forming device as in claim 1, wherein said pickup range setting means comprises:
a variable resistor having a shaft movable to change the resistance of said resistor;
a pickup range setting knob fixed to the shaft of said resistor;
control means setting a pickup range of said pickup device matching the resistance of said variable resistor; and
means visually displaying the end positions of said pickup range.

6. A portable image forming device as in claim 1, wherein said device has a housing with a front face and said pickup range setting means comprises:
cursors setting the end positions of said pickup range on the front face, viewing in the subscan direction, of said housing close to the original;
a slit-shape opening extending in the primary scan direction and passing light beams reflecting from the original;
a screening film covering the part of said opening corresponding to the space between at least one end of said opening and one of said cursors; and
means controlling so as to pick up as original picture image information the information picked up by said pickup device from the part of said opening which is not covered by the film.

7. A portable copying machine movable as a unit relative to an original which comprises:
a single casing enclosing a web of paper loaded therein, a pickup device having projected pickup elements which read a line of an image on said original and a printer device having a writing head writing the output of said pickup device on said web of paper; and
means performing original pickup scan by moving on the original and means permitting the feeding of said web of paper to said writing head as required by the copying machine's movement.

8. A portable copying machine as in claim 7, wherein said means permitting the feeding of said web of paper comprises:
a member rotating at a speed proportionate to the speed of said movement of said copying machine on the original; and
means generating control pulses at intervals in proportion to the rotational speed of said member.

9. A portable image forming device which is moved on an original in a direction perpendicular to a primary scan direction to perform a subscan, comprising a housing supporting:
an image pickup device;
an image forming system causing light reflected from the original to impinge on the pickup device as the image forming device is moved on the original; and
means for varying the pickup range of the pickup device in the primary scan direction and for selectively setting said pickup range.

10. A portable image forming device as in claim 9, including means for causing the light reflected by the original to impinge on the same area of the image pickup device for each different setting of said pickup range.

11. A portable image forming device as in claim 9, wherein the means for varying and setting the pickup range of the pickup device in the primary scan direction comprise pickup range setting cursors which are supported by the housing and at least one of which is slidably movable relative to the housing in the primary scan direction, and including means responsive to said movement of at least one cursor to deactivate any portion of said image pickup device which corresponds to an area of the original outside the set pickup range.

12. A portable image forming device as in claim 9, wherein the image pickup device produces output data representative of the image of the original carried by said light impinging on the pickup device, and wherein the means for varying and setting the pickup range of the pickup device in the primary scan direction comprise pickup range setting cursors which are supported by the housing and at least one of which is slidably movable relative to the housing in the primary scan direction, and including means responsive to said movement of at least one cursor to nullify any output data corresponding to an area of the original outside the set pickup range.

13. A portable image forming device as in claim 9, wherein the means for varying and setting said pickup range comprise a variable resistor having a resistance setting shaft, a manually operable pickup range setting knob drivingly coupled to said shaft, means for setting said pickup range to match the resistance of said variable resistor, and means for visually displaying the end positions of the set pickup range.

14. A portable image forming device as in claim 9, wherein the means for varying and setting the pickup range comprise cursors which are supported by the housing and set the end positions of the pickup range along the primary scan direction, a slit-shape opening in the housing which extends in the primary scan direction and through which light from the original passes to go through the image forming system and impinge on the pickup device, a screening film covering a part of said opening which extends from one longitudinal end of the opening toward the other longitudinal end, and means to selectively move the film relative to the opening so as to cover a greater of a lesser portion thereof.

15. A portable copying machine for forming a copy of an original over which the copying machine is moved as a unit, comprising:

a single casing having a slit opening and supporting a pickup device, means for projecting onto the pickup device an image of at least a part of the portion of the original which is visible through the slit opening, to cause the pickup device to provide an output signal corresponding to the image projected thereon, and a printer device having a copy paper web loaded inside the casing, a writing head responsive to said output signal to write on said copy paper a copy image corresponding to the image projected on the pickup device, and means responsive to manually moving the casing relative to the original to permit paper from said web of copy paper to advance relative to the writing head.

16. A portable copying machine as in claim 15 in which the means responsive to manually moving the casing relative to the original to permit paper from said web of copy paper to advance relative to the writing head comprise a member which is supported by said casing to make contact with the original and to be rotated thereby as the casing is manually moved relative to the original, means responsive to rotation of said member for generating a control signal for advancing said copy paper, and means responsive to said control paper to cause the copy paper to advance by increments proportional to said rotation.

17. A portable copying machine for forming a copy of an original over which the copying machine is moved as a unit, comprising:

a single casing having a slit opening and enclosing and supporting (i) a pickup device, (ii) means for projecting onto the pickup device an image of at least a part of the portion of the original which is visible through the slit opening, to cause the pickup device to provide an output signal corresponding to the image projected thereon, (iii) a web of copy paper, and (iv) a printer device having a writing head responsive to said output signal to write on copy paper fed from said web of copy paper enclosed in the casing a copy image corresponding to the image projected on the pickup device;

wherein when the casing is moved as a unit relative to the original, copy paper from said web can be advanced relative to said writing head to thereby write thereon said image of at least a part of the portion of the original visible through the slit opening.

18. A portable copying machine as in claim 17 including means supported by and at least partly enclosed in the casing for feeding copy paper from said web in response to movement of said casing relative to the original to thereby permit said copy paper to advance relative the writing head.

19. A portable copying machine as in claim 18 in which the means responsive to moving the casing relative to feed paper from said web of copy paper to permit said paper to advance relative to the writing head are means supported solely by the casing and comprising a member which is supported by said casing to make contact with the original and to be rotated thereby as the casing moves relative to the original, means responsive to rotation of said member for generating a control signal for advancing said copy paper, and means responsive to said control paper to feed copy paper from said web and to cause said paper to advance relative to the writing head at a speed corresponding to the speed of movement of the casing relative to the original.

20. A portable copying machine as in claim 17 in which said slit opening has a maximum width, and including means for causing the pickup device to provide an output signal selectively corresponding to only a part of the width of the slit opening.

* * * * *